US007726858B2

(12) United States Patent
Sato et al.

(10) Patent No.: US 7,726,858 B2
(45) Date of Patent: Jun. 1, 2010

(54) VEHICLE LIGHT USING LED LIGHT SOURCE

(75) Inventors: Koichi Sato, Tokyo (JP); Yasuyo Ikeda, Tokyo (JP); Qi Jing, Tokyo (JP); Satoshi Nagasawa, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/466,801

(22) Filed: Aug. 24, 2006

(65) Prior Publication Data

US 2007/0195545 A1 Aug. 23, 2007

(30) Foreign Application Priority Data

Aug. 24, 2005 (JP) ............................. 2005-242977

(51) Int. Cl.
*B60Q 1/00* (2006.01)
*F21V 11/00* (2006.01)
*B60Q 3/04* (2006.01)

(52) U.S. Cl. ....................... 362/538; 362/523; 362/539; 362/543; 362/544; 362/545; 362/546; 362/549; 362/269; 362/287; 362/427

(58) Field of Classification Search ......... 362/543–546, 362/269, 287, 427, 432, 523, 538–539, 549
See application file for complete search history.

(56) References Cited

U.S. PATENT DOCUMENTS

| | | | | |
|---|---|---|---|---|
| 5,490,049 | A * | 2/1996 | Montalan et al. | 362/240 |
| 2004/0085779 | A1 * | 5/2004 | Pond et al. | 362/516 |
| 2005/0122737 | A1 * | 6/2005 | Watanabe et al. | 362/544 |

FOREIGN PATENT DOCUMENTS

| | | |
|---|---|---|
| JP | 2003123517 | 4/2003 |

* cited by examiner

*Primary Examiner*—Sandra L O'Shea
*Assistant Examiner*—Sean P Gramling
(74) *Attorney, Agent, or Firm*—Cermak Kenealy Vaidya & Nakajima LLP

(57) ABSTRACT

A vehicle light can include a plurality of light projection units each having a replaceable LED lamp, a reflector unit, a projection lens, and a shielding member. A housing can be provided that includes a lens and a rear side part, with the housing configured to accommodate the light projection units. The rear side part can include a mounting opening therethrough with a base plate configured to be hermetically attached to the housing through the mounting opening of the rear side part. The replaceable LED lamp can be attached to the base plate, and an elastic connecting member can be configured to hermetically connect the housing and the base plate so that the LED lamps can be individually replaced. Since the LED lamps can be individually replaced, untrained persons can carry out the replacement operation. Furthermore, it is possible to reduce the replacement cost and time as well as improve the rate of operation of a vehicle.

6 Claims, 6 Drawing Sheets

VEHICLE LIGHT USING LED LIGHT SOURCE

This application claims the priority benefit under 35 U.S.C. §119 of Japanese Patent Application No. 2005-242977 filed on Aug. 24, 2005, which is hereby incorporated in its entirety by reference.

TECHNICAL FIELD

The presently disclosed subject matter relates to a vehicle light using LED light sources, and in particular, to a vehicle light using LED light sources, including a headlight, an auxiliary headlight, a fog light, a driving light, a running light, a spot light, traffic lights, and the like.

DESCRIPTION OF THE RELATED ART

Recently, the use of LEDs has been widespread, and various vehicle lights have adopted LEDs for use as their light source. FIG. 1 shows one example of a conventional vehicle light using LED light sources. (See, for example, Japanese Patent Laid-Open Publication No. 2003-123517). The vehicle light 90 is configured to include a plurality of light projection units 94 each including an LED lamp 91 and a reflector unit 92*a* (92*b*, 92*c*) in combination. In this case, a single LED lamp that is currently available cannot emit light with enough light intensity for use as, for example, a vehicle headlight. Therefore, a plurality of LED lamps 91 are used to provide enough total light intensity so as to comply with the regulations for vehicle headlights.

In this multi LED type of configuration, different types of light projection units, each with an appropriate light distribution property, can be combined to provide a desired light distribution property (or pattern) in total, for use as a vehicle light. Referring to FIG. 1, examples of such light projection units that are configured to be combined with each other include, but are not limited to, a light projection unit 94 having a reflector unit 92*a* configured for emitting a spot-shaped light distribution property, a light projection unit having a reflector unit 92*b* configured for emitting a horizontally wide light distribution property, a light projection unit having a reflector unit 92*c* configured for emitting an asymmetric wide light distribution property in order to emit light toward road traffic signs or pedestrians located at a left-side (right-side in the U.S.) of the vehicle, and the like (for example, a light reflector unit can be configured to partially project light upwardly).

These light projection units are appropriately selected for combination with each other in a vehicle light, and arranged within a housing 93 to integrate the respective units. Therefore, when all of (or part of) the light projection units are turned on, the respective projection units can emit light with corresponding light distribution properties (patterns) which then form a desired light distribution pattern in total (for example form a high-beam or low-beam light distribution pattern for a vehicle). At the same time, the light can be configured such that a required light intensity distribution is satisfied.

Note that, when LED lamps 91 are used as a light source in this type of conventional system, such a light source is generally soldered directly to a feed circuit (not shown). Thus, there is no replacement mechanism for facilitating removal or replacement of the light source.

In this conventional vehicle light 90, as clearly shown in FIG. 1, the plurality of light projection units 94—each of which includes an LED lamp 91 and respective reflector unit 92*a* (92*b*, 92*c*) in combination—are installed within the housing 93. In this construction, the respective light projection units 94 should be precisely installed to be aligned in the respective directions because each of the units 94 (combination of an LED lamp and a corresponding reflector unit) has a certain light axis (light-emitting direction). If the projection units are not precisely aligned, a desired total light distribution property may not be obtained.

Therefore, the installation of each of the light projection units 94 into the housing 93 requires severely high precision, which complicates the installation operation. In order to solve this problem, it is conceivable to unite or integrate all of the light projection units 94. Specifically, the set of reflector units 92*a*, 92*b*, and/or 92*c* can be integrally molded with a resin material so that the respective light-emitting directions of the reflecting units are properly set. Then, LED lamps 91 are installed into respective reflector units 92*a*, 92*b*, and/or 92*c* and the integrated body is mounted to a housing 93 to complete the vehicle light 90. Thus, accurate alignment of respective light-emitting directions can be accomplished with minimal process steps.

As a result, a vehicle light 90 that has a proper light distribution property immediately after fabrication can be achieved. However, during use of the light, if a strain is generated over the resin molded portion of the reflector units by an impact due to collision or the like, it is difficult to fix the strain. In this case, the projection units, integrally formed and including the LED lamps 91 and the reflector units 92*a* (*b, c*), sometimes must be entirely replaced, thereby imposing a financial burden on the vehicle owner requiring repair, vehicle down time, and resulting in a waste of materials.

SUMMARY

In view of the above-mentioned and other problems and considerations, the present inventors have made an intensive study, and disclose herein a vehicle light with the following characteristics and features.

In particular, one aspect of the presently disclosed subject matter is to provide a vehicle light formed by integrally combining a plurality of light projection units that each has an LED lamp serving as a light source. Specifically, the vehicle light can include: a plurality of light projection units each having a replaceable LED lamp as a light source; a housing accommodating the light projection units; and a base plate which can be hermetically attached to and detached from a rear surface of the housing, wherein the replaceable LED lamps are mounted thereon so as to be individually replaceable.

In the vehicle light configured as described above, the projection unit may further have a reflector unit which can be freely attached to and detached from the base plate so as to be individually replaceable.

The light projection unit may also have a projection lens which can be freely attached to and detached from the light projection unit so as to be individually replaceable.

The base plate can be aimed while the housing is attached to a vehicle body.

The vehicle light may further include an elastic connecting member which hermetically connects the housing and the base plate.

The plurality of light projection units can include at least one of a light projection unit having a spot-shaped light distribution property, a light projection unit having a horizontally wide light distribution property, and a light projection unit having a light distribution property that is configured to project light such that the light includes an upwardly directed light beam.

In accordance with another aspect of the disclosed subject matter a vehicle light can include: a plurality of light projection units each having a replaceable LED lamp, a reflector unit, a projection lens, and a shielding member. The light can include a housing having a lens and a rear side part, the housing being configured to accommodate the light projection units, wherein the rear side part of the housing has a mounting opening therethrough. A base plate can be configured to be hermetically attached to the housing through the mounting opening of the rear side part and can be detached from the housing. The replaceable LED lamp can be attachable to the base plate. An elastic connecting member can be configured to hermetically connect the housing and the base plate wherein the LED lamps can be individually replaced.

In the vehicle light configured as described above, the reflector unit can be freely attached to and detached from the base plate so as to be individually replaceable.

The projection lens can also be freely attached to and detached from the projection unit so as to be individually replaceable.

The vehicle light may further include an aiming adjusting mechanism for allowing the base plate to be aimed when the housing is attached to a vehicle body.

The plurality of light projection units can include at least one of a light projection unit having a spot-shaped light distribution property, a light projection unit having a horizontally wide light distribution property, and a light projection unit having a light distribution property configured to project light that includes an upwardly directed light beam. The light projection units can include at least these three types of light projection units.

The vehicle light can be configured to allow a plurality of light projection units to be installed onto a single base plate. The base plate can be attachable to and detachable from the housing. This configuration facilitates the accurate positioning of light projection units on the base plate in advance, thereby improving the operation efficiency. Furthermore, this configuration allows the LED lamps to be individually replaced, thereby facilitating the repair of any mechanical or electrical failure such that the light can recover its normal state in a manner similar to bulb replacement for conventional lighting devices that employ light bulbs as their light source.

BRIEF DESCRIPTION OF THE DRAWING

These and other characteristics, features, and advantages of the disclosed subject matter will become clear from the following description with reference to the accompanying drawings, wherein.

DETAILED DESCRIPTION OF EXEMPLARY EMBODIMENTS

Figure 1:
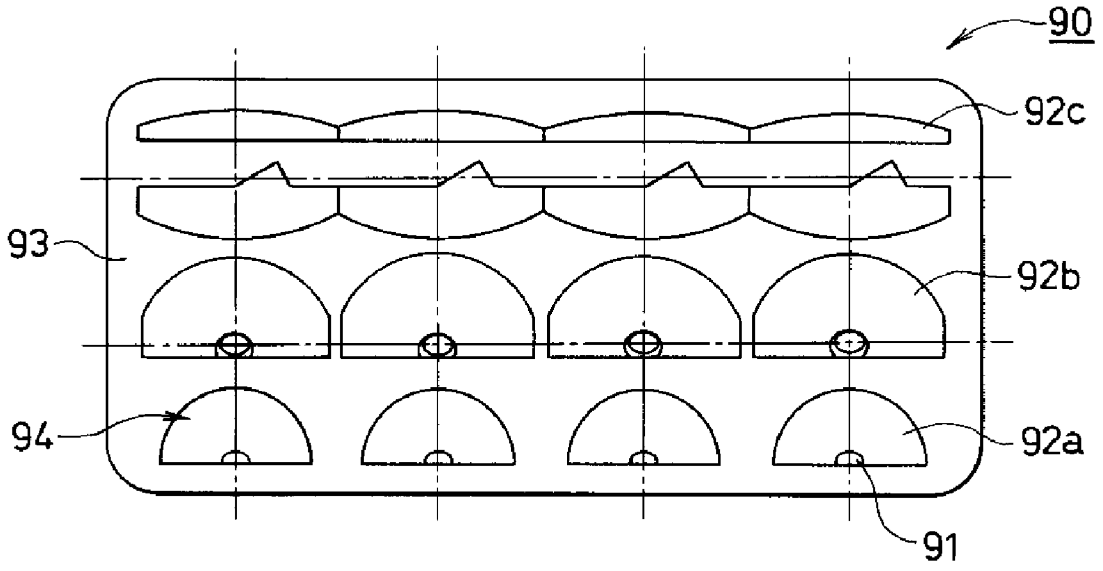
Fig. 1 Conventional Art
FIG. 1 is a front view of a conventional example of a vehicle headlight using LED light sources.
Figure 2:
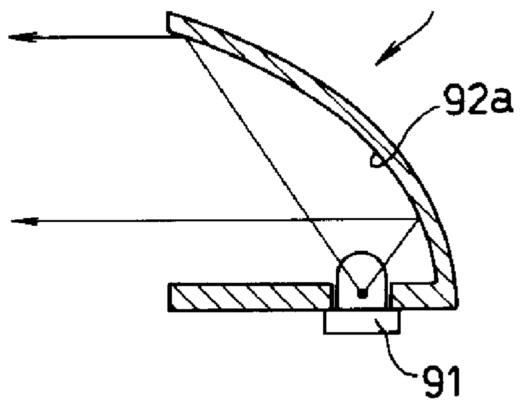
Fig. 2 Conventional Art
FIG. 2 is a cross-sectional view showing one example of a reflector unit installed in the conventional vehicle headlight of FIG. 1.
Figure 3:
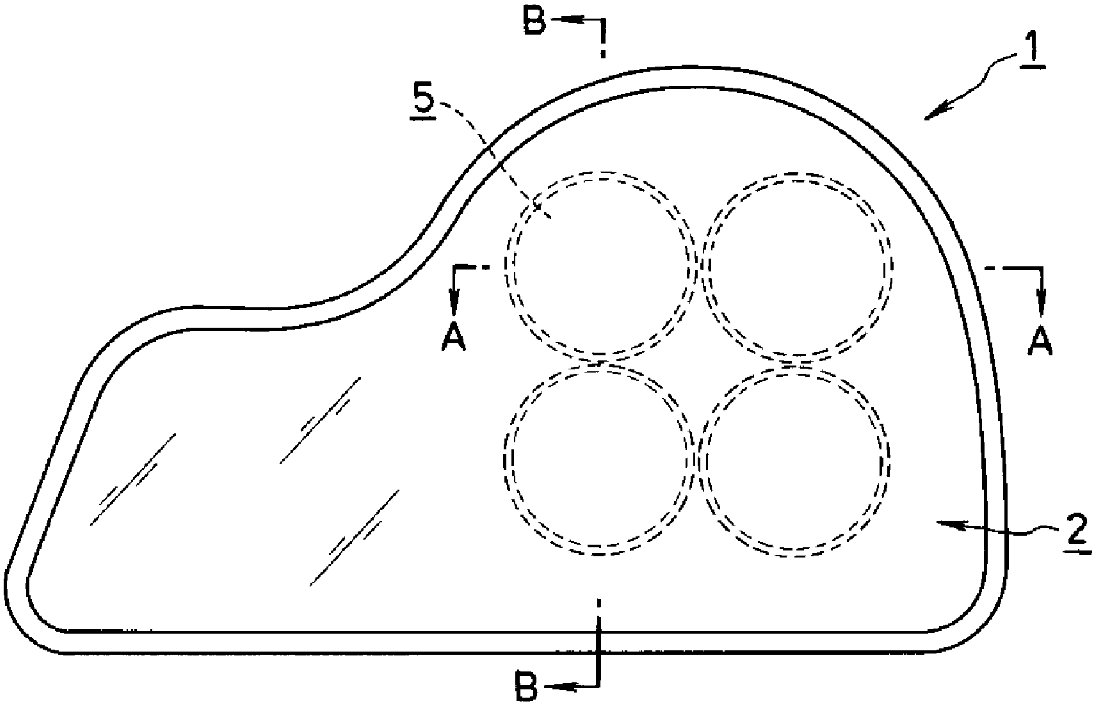
FIG. 3 is a schematic front view of one exemplary embodiment of a vehicle headlight using an LED light source made in accordance with principles of the disclosed subject matter.
Figure 4:
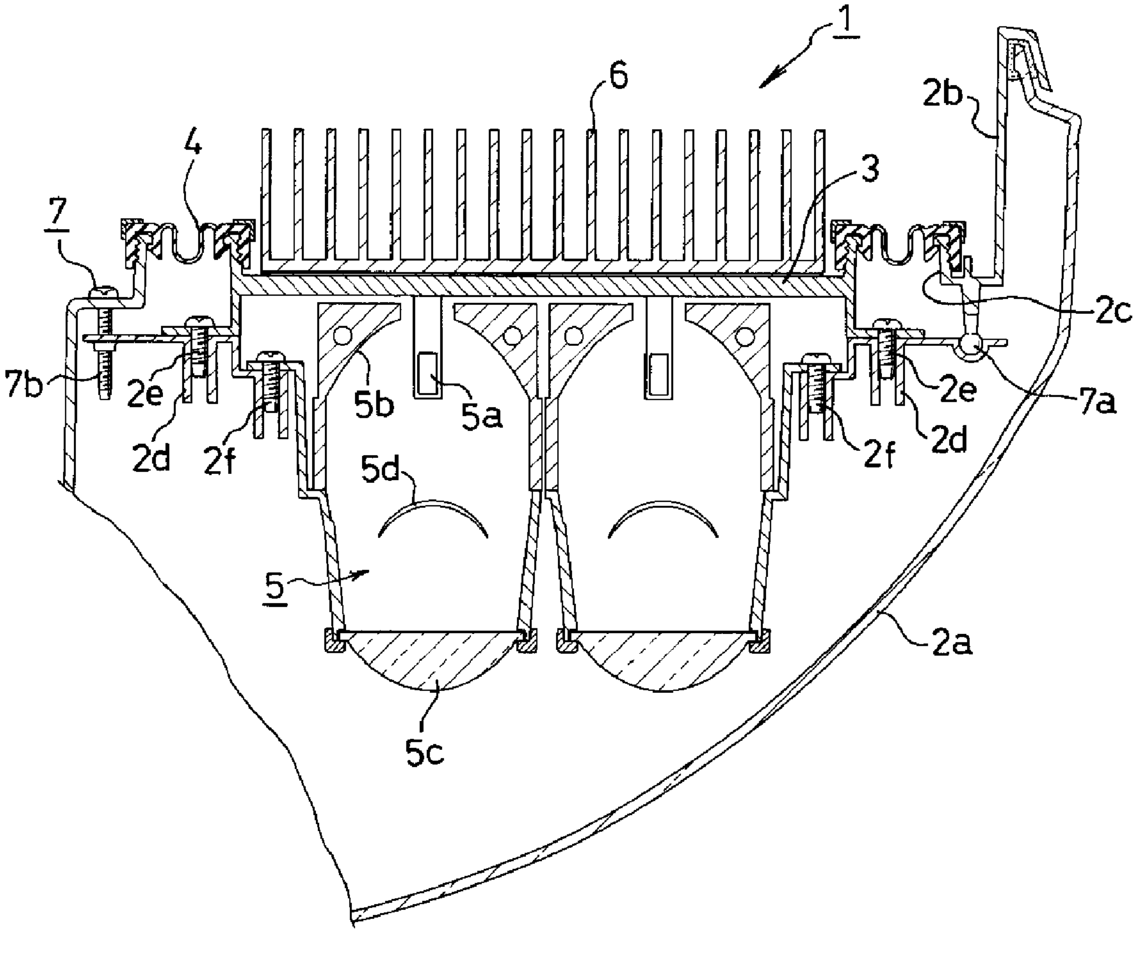
FIG. 4 is a cross-sectional view taken along line A-A in FIG. 3.

Next, the presently disclosed subject matter will be described in more detail based on some exemplary embodiments with reference to the accompanying drawings. In FIG. 3, the reference numeral 1 denotes a vehicle light using LED light sources, and in this exemplary embodiment the light may serve as a vehicle headlight (hereinafter, referred to as a headlight 1). FIG. 4 shows a cross-sectional view taken along line A-A of FIG. 3. The headlight 1 can include, when roughly classified, a housing 2, a base plate 3, a cover (elastic connecting member) 4, and a plurality of light projection units 5, as shown in FIG. 4.

The housing 2 can be configured to include a lens **2*a* and a rear plate (rear side part) 2*b* provided with a mounting opening 2*c* to which the base plate 3 is attached like a lid. The cover 4 can cover the space between the edge of the mounting opening 2*c* and the base plate 3 so as to hermetically seal the inside of the housing 2**.

The light projection unit 5 can include an LED lamp **5*a* mounted on the base plate 3, a reflector unit 5*b*, a projection lens 5*c*, and a shielding member 5*d*** so as to serve as a projector type lighting unit.

The headlight 1 can include a plurality of the above described light projection units 5 to emit light with a predetermined light intensity distribution and a predetermined light distribution property (pattern) by overlapping the projected light beams from the respective units. On the rear surface of the base plate 3, a heat sink 6 (heat radiation plate) may be provided so as to dissipate the heat generated by the LED lamps **5*a***.

Figure 5:
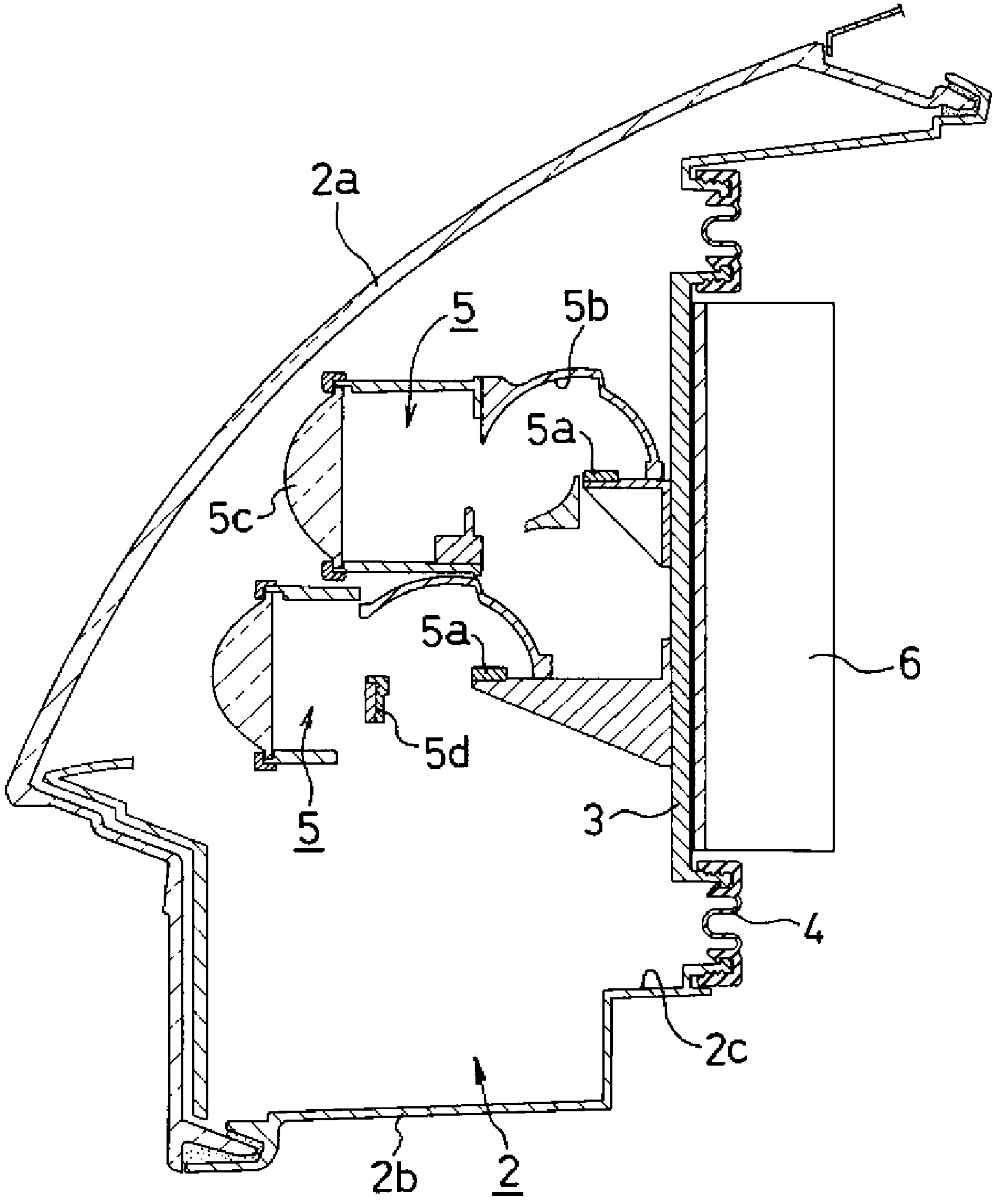
FIG. 5 is a cross-sectional view taken along line B-B in FIG. 3.

FIG. 5 is a cross-sectional view taken along line B-B of FIG. 3. As shown in this cross-sectional view, the LED lamps **5*a* mounted on the base plate 3 are configured to be replaceable with new ones. For example, when the LED lamp 5 is broken due to over-voltage, mechanical shock, etc., or deteriorates in performance due to humidity, or other factors, each of the LED lamps 5*a*** can be individually replaced with a new LED lamp.

Specific structural examples for replacing an LED lamp **5*a* can include the use of various connector systems which facilitate the easy replacement of LED lamps without any dedicated tools or jigs. Examples of the LED lamp 5*a* include, but are not limited to, an LED lamp with pin-type electrodes, an LED lamp with plate-shaped electrodes, and the like. The base plate 3** can be provided with sockets for receiving an electrode of a corresponding type, and the electrode can be inserted into the socket to facilitate the replacement of an LED lamp.

Figure 6:
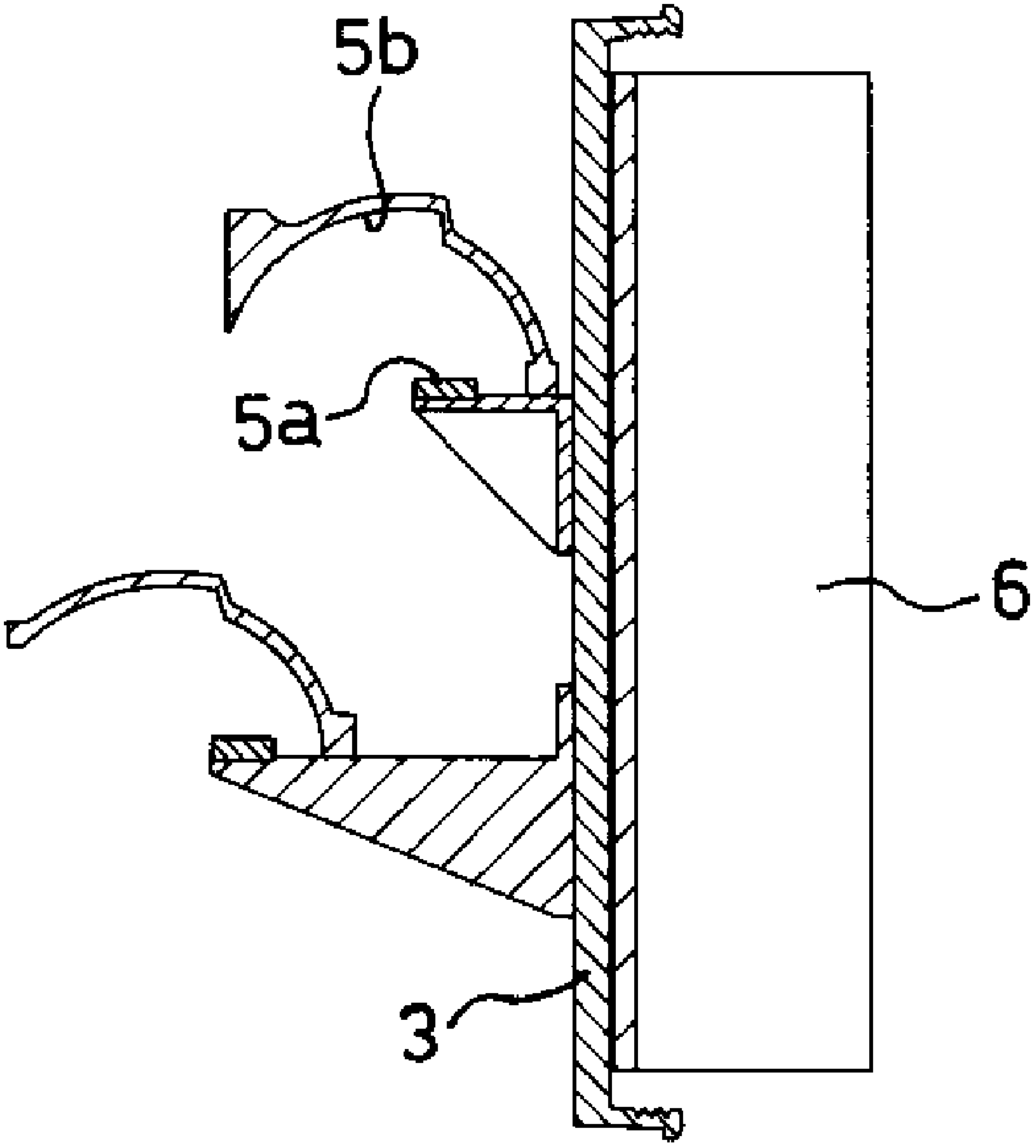
FIG. 6 is a partial cross-sectional view showing a base plate removed from the housing.

The reflector unit **5*b*, the projection lens 5*c*, and the shielding member 5*d* can be configured to be freely removable from the base plate 3, similar to the LED lamp 5*a*. Therefore, the replacement of the LED lamp 5*a* can further be facilitated. For example, with reference to FIG. 4, first the cover 4 is removed. Then, a first mounting screw 2*e* for attaching a mount bracket 2*d* on the housing 2 side with the base plate 3 can be removed, thereby separating the base plate 3 and the housing 2. Accordingly, the base plate 3, the LED lamp 5*a*, and the reflector unit 5*b* can be removed from the housing 2 as shown in FIG. 6**.

In accordance with this configuration, the LED lamp 5*a* can be replaced with a new one while it is removed from the light and located outside the housing 2. In this case, a skilled technique like soldering is not required. One can simply remove the broken LED lamp from the socket and insert a new one into the socket, which is similar to the process for replacement of typical light bulbs. This means that untrained persons can replace the lamps without difficulty.

In the above-mentioned case, when the base plate 3 with the LED lamp 5*a* and the reflector unit 5*b* mounted thereon is removed, the projection lens 5*c* is still attached to the housing 2 via the mount bracket 2*d*. Therefore, in the case when a crack, chip, or stain exists on the lens, the projection lens 5*c* can be removed from the housing 2 by removing a second mounting screw 2*f*, thereby enabling replacement or cleaning of the removed lens.

Accordingly, in the headlight 1, almost all of the components of the projection unit 5 that are located within the housing 2 can be removed from the housing 2. This can improve its mobility for repair or the like. In addition, a user's degree of creative freedom can increase such that a user can remove a projection lens 5*c* that has a particular quality, such as size, light distribution, color, etc., and replace it with a lens that has a different quality, such as a differently shaped or sized or colored lens. For example, a clear lens can be replaced with a yellow lens for use as a fog light or the like.

Next, the mount bracket 2*d* will be described, which can hold the base plate 3, the reflector unit 5*b*, the projection lens 5*c*, and the like and can itself form the housing 2 of the light. The mount bracket 2*d* may be provided with an aiming mechanism 7 composed of, for example, a ball joint 7*a*, an adjustment screw 7*b*, and other components. The mount bracket 2*d* can be mounted onto the rear plate 2*b* of the housing 2.

The aiming mechanism 7 can be operated so as to direct a surface direction of the base plate 3 to a desired direction. Namely, it is possible to simultaneously adjust all of the light-emitting directions of the plurality of (4 in the shown example) light projection units 5 mounted on the base plate 3 (simultaneous aiming). This means that there is no need to individually aim the light projection units 5. In accordance with the disclosed subject matter, the positional displacement between the housing 2 and the base plate 3 due to the aiming process can be absorbed by the cover 4 since the housing 2 and the base plate 3 are connected via the cover 4 which is formed of a flexible member such as rubber.

Furthermore, in the embodiment shown in FIG. 4, the mounting opening 2*c* is provided in the rear plate 2*b* of the housing 2, and the base plate 3 is attached to the housing 2 via the cover 4 so as to expose the rear surface of the base plate 3 to the atmosphere from the opening 2*c*. Therefore, a sufficiently large heat sink 6 can be mounted to the rear surface (outside surface) of the base plate 3. This heat sink 6 can efficiently radiate heat generated by the LED lamps 5*a* to prevent a severe temperature rise from occurring. The heat sink 6 can also prevent deterioration in illumination qualities that can occur due to overheating of the LED lamps 5*a*.

In addition to this, the LED lamps 5*a* in this embodiment can be individually and easily replaced. For example, LED lamps for use in a vehicle light are operated at a rated power (or thereabout) in order to ensure a desired light amount, as compared to LED lamps for use in a signal light which do not require the same strict power requirements. Therefore, deterioration of lamps at high temperatures during summer time may occur in vehicle lights. Even when such deterioration occurs due to failure of a particular LED lamp 5*a*, replacement of only the broken LED lamp 5*a* can easily recover the original performance of the vehicle light.

Recent vehicle headlights have components that are formed in combination, and therefore, it may be necessary to replace the entire light when deterioration in a particular component occurs. This requires man hours for repair and increases the cost of repair and replacement. However, according to an aspect of the disclosed subject matter, the conventional combined component LED lamp repair/replacement methods can be avoided, and an easy repair method in which only the broken LED lamp 5*a* is replaced with a new lamp can be realized. This can reduce the required man hours and cost of repair/replacement. This also can improve the rate of operation of the vehicle itself.

The above description has been given with respect to an illumination light such as those used as a headlight, but the present subject matter can be applied to various other lighting devices, including a vehicle headlight incorporating a signal light within the same housing 2. In this case, the signal light does not need to be a light that has the same configuration as the above-described headlight 1 because a rated power is not required for turning on a signal light, and therefore failure is less likely to occur in the signal light.

Figure 7:
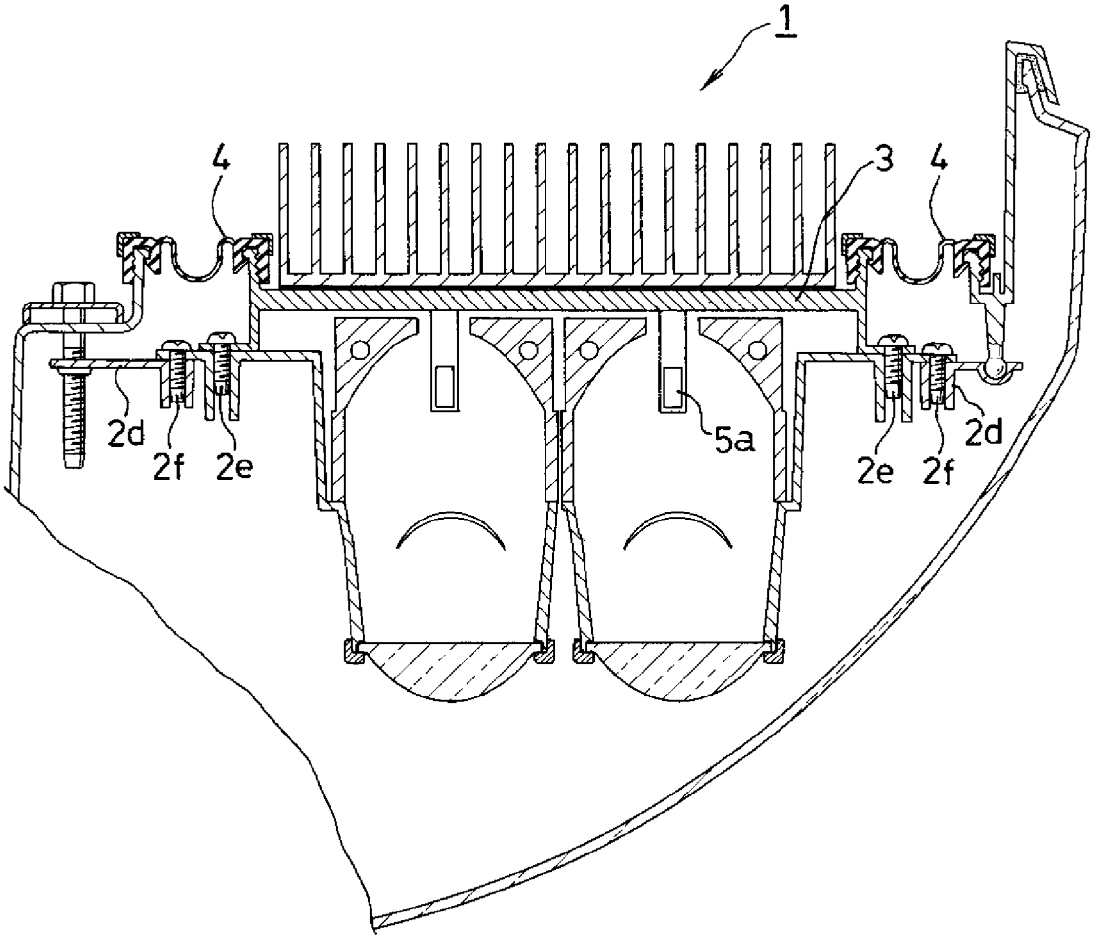
FIG. 7 is a cross-sectional view of another exemplary embodiment of a vehicle headlight using LED light sources made in accordance with principles of the disclosed subject matter.

FIG. 7 shows a cross-sectional view of a vehicle headlight of another exemplary embodiment made in accordance with principles of the disclosed subject matter.

In this configuration, after removing the socket cover 4, the base plate 3 including the LED lamps 5*a* and the heat sink 6 can be removed by removing the first mounting screw 2*e* from the mount bracket 2*d*. Then, by removing the second mounting screw 2*f* the entire light projection unit 5 can be removed. Since the other parts can be the same or similar as the previously described exemplary embodiment of the vehicle light shown in FIG. 4, detailed description thereof will be omitted.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A vehicle light comprising:

a plurality of light projection units each having a replaceable LED lamp, a reflector unit, a projection lens, and a shielding member;

a housing having a lens and a rear side part, the housing configured to accommodate the light projection units, wherein the rear side part of the housing has a mounting opening therein, and the housing includes a mounting bracket;

a base plate configured to be attachable to the housing adjacent the mounting opening of the rear side part and configured to be detachable from the housing, the replaceable LED lamp configured to be attached to the base plate;

a first mounting structure configured to selectively connect and disconnect the base plate to the mounting bracket of the housing, the first mounting structure being entirely spaced from the light projection units;

a second mounting structure configured to selectively connect and disconnect the plurality of light projection units to the mounting bracket of the housing; and an elastic connecting member configured to connect the housing and the base plate, wherein the base plate, reflector units and LED lamps are configured such that when the first attachment structure is operated to disconnect the base plate from the mounting bracket of the housing, the base plate, reflector units and LED lamps move with respect to at least one of the projection lenses and the shielding members.

2. The vehicle light according to claim 1, wherein the reflector unit is configured to be attachable to and detachable from the base plate so as to be individually replaceable.

3. The vehicle light according to claim 1, wherein the projection lens is configured to be attachable to and detachable from a respective projection unit so as to be individually replaceable.

4. The vehicle light according to claim 1, further comprising an aiming adjusting mechanism configured to permit the base plate to be aimed when the housing is attached to a vehicle body.

5. The vehicle light according to claim 1, wherein the plurality of light projection units includes at least one of a light projection unit having a spot-shaped light distribution property, a light projection unit having a horizontally wide light distribution property, and a light projection unit having a light distribution property configured to project light that includes an upwardly directed light beam.

6. The vehicle light according to claim 1, wherein the elastic connecting member hermetically connects the housing and the base plate.

* * * * *